(12) United States Patent
Dasdan et al.

(10) Patent No.: US 8,190,610 B2
(45) Date of Patent: May 29, 2012

(54) MAPREDUCE FOR DISTRIBUTED DATABASE PROCESSING

(75) Inventors: Ali Dasdan, San Jose, CA (US);
Hung-Chih Yang, Sunnyvale, CA (US);
Ruey-Lung Hsiao, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1105 days.

(21) Appl. No.: 11/539,090

(22) Filed: Oct. 5, 2006

(65) Prior Publication Data
US 2008/0086442 A1    Apr. 10, 2008

(51) Int. Cl.
*G06F 17/30* (2006.01)
(52) U.S. Cl. ........................ 707/737; 707/968
(58) Field of Classification Search .......... 707/1–3, 707/737, 968
See application file for complete search history.

(56) References Cited

U.S. PATENT DOCUMENTS

| | | | | |
|---|---|---|---|---|
| 6,158,044 A * | 12/2000 | Tibbetts | ........................ | 717/100 |
| 6,341,289 B1 * | 1/2002 | Burroughs et al. | ........... | 707/737 |
| 6,678,691 B1 * | 1/2004 | Kikkers | ........................ | 707/102 |
| 7,065,618 B1 | 6/2006 | Ghemawat et al. | | |
| 7,620,936 B2 * | 11/2009 | Ernst et al. | ..................... | 717/108 |
| 2004/0225638 A1 * | 11/2004 | Geiselhart et al. | ................ | 707/1 |
| 2004/0230567 A1 * | 11/2004 | Wookey | ............................ | 707/3 |
| 2006/0117036 A1 * | 6/2006 | Cruanes et al. | ............... | 707/100 |
| 2007/0038659 A1 * | 2/2007 | Datar et al. | ................... | 707/101 |
| 2007/0255685 A1 * | 11/2007 | Boult et al. | ....................... | 707/2 |

OTHER PUBLICATIONS

Jeffrey Dean and Sanjay Ghemawat, "MapReduce: Simplified Data Processing on Large Clusters", USENIX Association OSDI '04: 6th Symposium on Operating Systems Design and Implementation, Dec. 6-8, 2004, pp. 137-149.

* cited by examiner

*Primary Examiner* — Khanh Pham
(74) *Attorney, Agent, or Firm* — Weaver Austin Villeneuve & Sampson LLP

(57) ABSTRACT

An input data set is treated as a plurality of grouped sets of key/value pairs, which enhances the utility of the MapReduce programming methodology. By utilizing such a grouping, map processing can be carried out independently on two or more related but possibly heterogeneous datasets (e.g., related by being characterized by a common primary key). The intermediate results of the map processing (key/value pairs) for a particular key can be processed together in a single reduce function by applying a different iterator to intermediate values for each group. Different iterators can be arranged inside reduce functions in ways however desired.

46 Claims, 5 Drawing Sheets

MAPREDUCE FOR DISTRIBUTED DATABASE PROCESSING

BACKGROUND

MapReduce is a programming methodology to perform parallel computations over distributed (typically, very large) data sets. Some theory regarding the MapReduce programming methodology is described in "MapReduce: Simplified Data Processing on Large Clusters," by Jeffrey Dean and Sanjay Ghemawat, appearing in OSDI'04: Sixth Symposium on Operating System Design and Implementation, San Francisco, Calif., December, 2004 (hereafter, "Dean and Ghemawat"). A similar, but not identical, presentation is also provided in HTML form at the following URL: http://labs.google.com/papers/mapreduce-osdi04-slides/index.html (hereafter, "Dean and Ghemawat HTML").

Basically, a "map" function maps key-value pairs to new (intermediate) key-value pairs. A "reduce" function represents all mapped (intermediate) key-value pairs sharing the same key to a single key-value pair or a list of values. The "map" and "reduce" functions are typically user-provided. The map function iterates over a list of independent elements, performing an operation on each element as specified by the map function. The map function generates intermediate results. The reduce operation takes these intermediate results via a single iterator and combines elements as specified by the reduce function.

SUMMARY

In accordance with an aspect, an input data set is treated as a plurality of grouped sets of key/value pairs, which enhances the utility of the MapReduce programming methodology. Utilizing such grouping, map processing is carried out independently on two or more related datasets (e.g., related by each being characterized by a schema with a key in common). The intermediate results of the map processing (key/value pairs) for a particular key are processed together in a single reduce function by applying a different iterator to intermediate values for each group. Different iterators can be composed inside reduce functions in ways however desired.

Thus, for example, the enhanced MapReduce programming methodology may be easily employed to carry out distributed relational database processing.

DETAILED DESCRIPTION

The inventors have realized that, by treating an input data set as a plurality of grouped sets of key/value pairs, the utility of the MapReduce programming methodology may be enhanced. By utilizing such a grouping, map processing can be carried out independently on two or more related datasets (e.g., related by being characterized by a common key). The intermediate results of the map processing (key/value pairs) for a particular key can be processed together in a single reduce function by applying a different iterator to intermediate values for each group.

Figure 1:
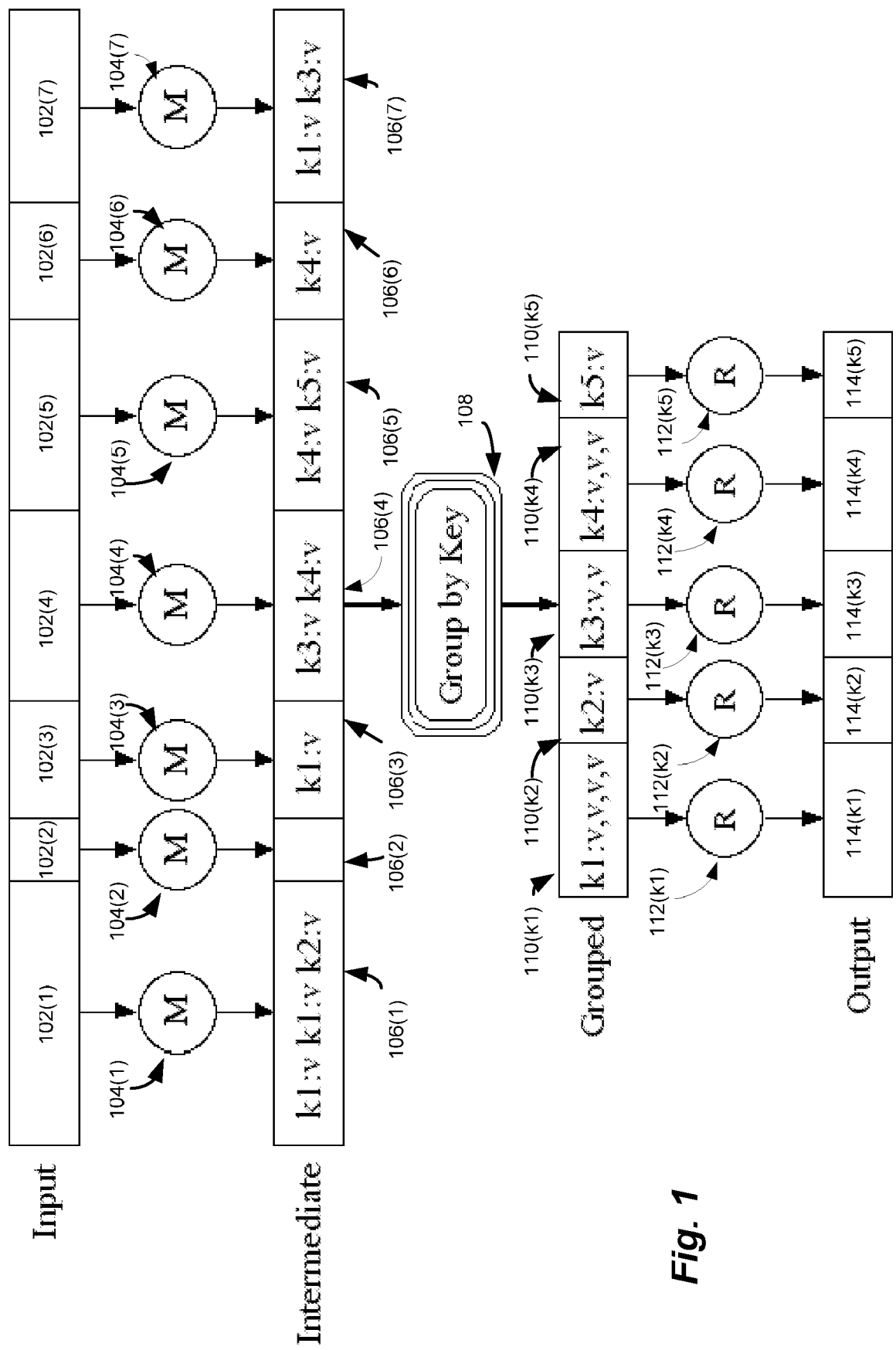
FIG. 1 illustrates an example of the conventional MapReduce architecture.

Before discussing the aspect in which the input data set is treated as a plurality of grouped sets of key/value pairs, it is useful to first discuss, as background, the conventional architecture. The conventional architecture is described, for example, in Dean and Ghemawat referred to in the Background. FIG. 1, illustrating an example of the conventional architecture, which is substantially reproduced from Dean and Ghemawat HTML (at slide 7) but with reference numerals added here to aid in the description. In the example, the keys of the input data key/value pairs comprise keys k1 to k5.

As discussed by Dean and Ghemawat, and as shown in the FIG. 1 illustration, both the input data set 102 and the output data set 114 are a set of key value pairs. The programmer specifies a map function that processes input key/value pairs and produces a set of intermediate pairs 106(1) through 106(7). In the abstract, such a map function is specified as follows:

map (in_key, in_value) → list(out_key, intermediate_value)

In the FIG. 1 illustrative example, the input data set 102 is partitioned into an arbitrary grouping of seven partitions 102(1) through 102(7). Each partition is provided to the corresponding invocation of the map function, which has seven invocations 104(1) through 104(7).

The group-by-key functionality 108 partitions the intermediate results by out_key, and the intermediate partitions 110(k1) to 110(k5) are provided to the corresponding reduce functions 112(k1) to 112(k5), respectively. Each reduce function 112(k1) to 112(k5) processes intermediate data from one of the intermediate partitions 110(k1) to 110(k5) to generate the corresponding output partitions 114(k1) to 114(k5). In the abstract, such a reduce function is specified as follows:

reduce (out_key, list(intermediate_value)) → list(out_value)

The reduce function combines all intermediate values for a particular key and produces a set of merged output values for the key, usually just one.

Figure 2:
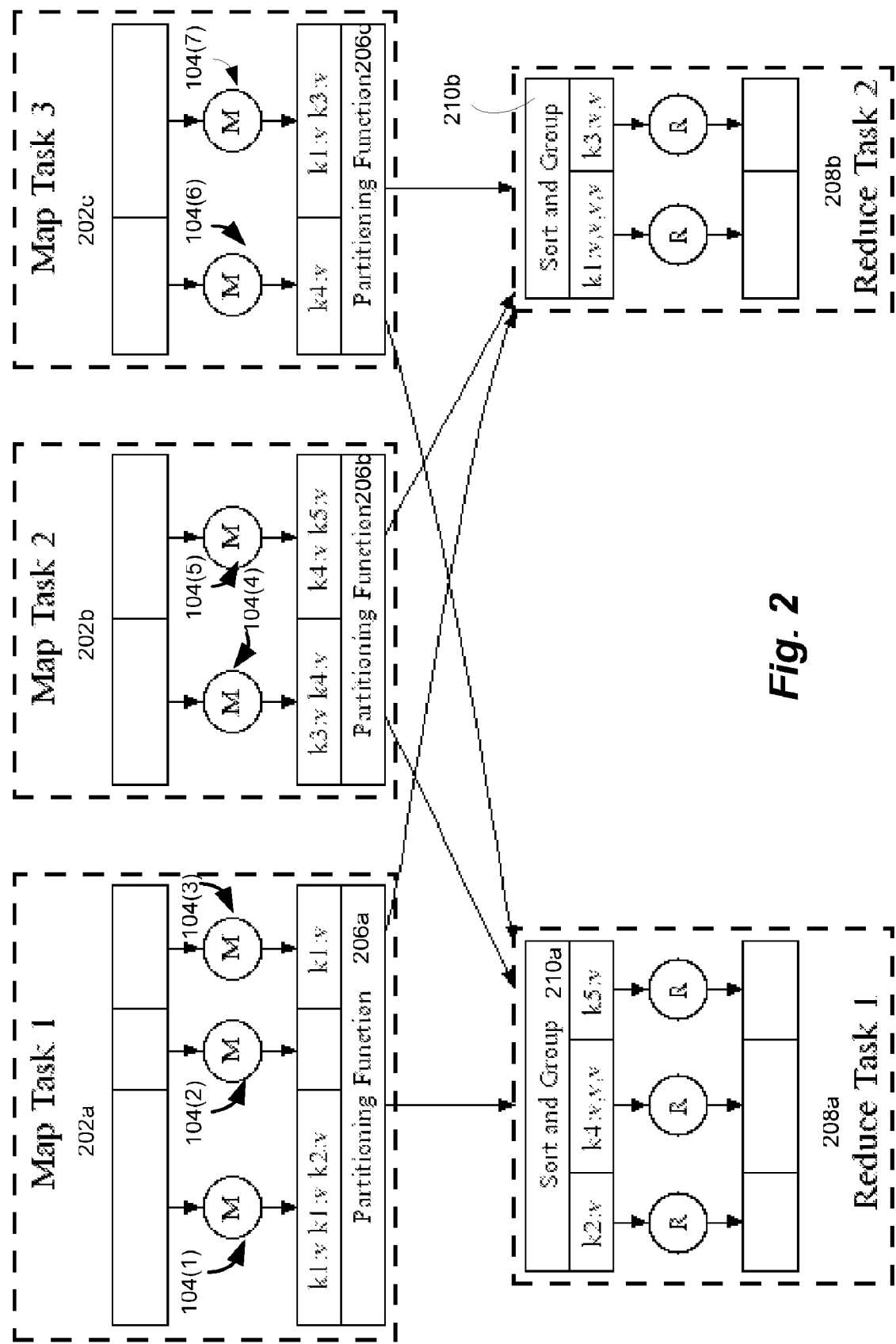
FIG. 2 illustrates a specific parallel implementation of the FIG. 1 architecture.

FIG. 2 illustrates a parallel implementation of the FIG. 1 architecture. For simplicity of illustration, only some of the elements in FIG. 2 are denoted by reference numerals, and it is clearly evident that others of the elements correspond to elements in FIG. 1. In the implementation, the map functions 104 are partitioned into a user-configurable number of map tasks 202a, 202b and 202c (here, three map tasks). Similarly, the reduce functions are partitioned into a user-configurable number of reduce tasks 208a and 208b (here, two reduce tasks). Each map task 202a, 202b, and 202c includes a partitioning function 206a, 206b and 206c, respectively, that partitions the intermediate data across the reduce tasks 208a and 208b. Each reduce task 206a and 206b includes a sort and group-by-key task 210a and 210b, respectively, which can make the processing of the output data more efficient and/or convenient.

Although not shown in FIGS. 1 and 2, the partitioned data can go through a configurable, intermediate step in which a "combiner" function is called. A combiner function is similar to a reduce function with the following difference: a combiner runs after a mapper and performs a partial merging on each partition before they are transferred to a reducer. This helps reduce the network traffic and speed up the total execution time.

Conventional MapReduce implementations enable the use of massive clusters of commodity computers to provide a simplified programming and execution model for processing large sets of data in parallel. In addition, the application is isolated from messy but important details of running a distributed program on massive clusters of potentially unreliable computers. However, the conventional MapReduce implementations do not have facility to efficiently process data from heterogeneous sources.

Figure 3:
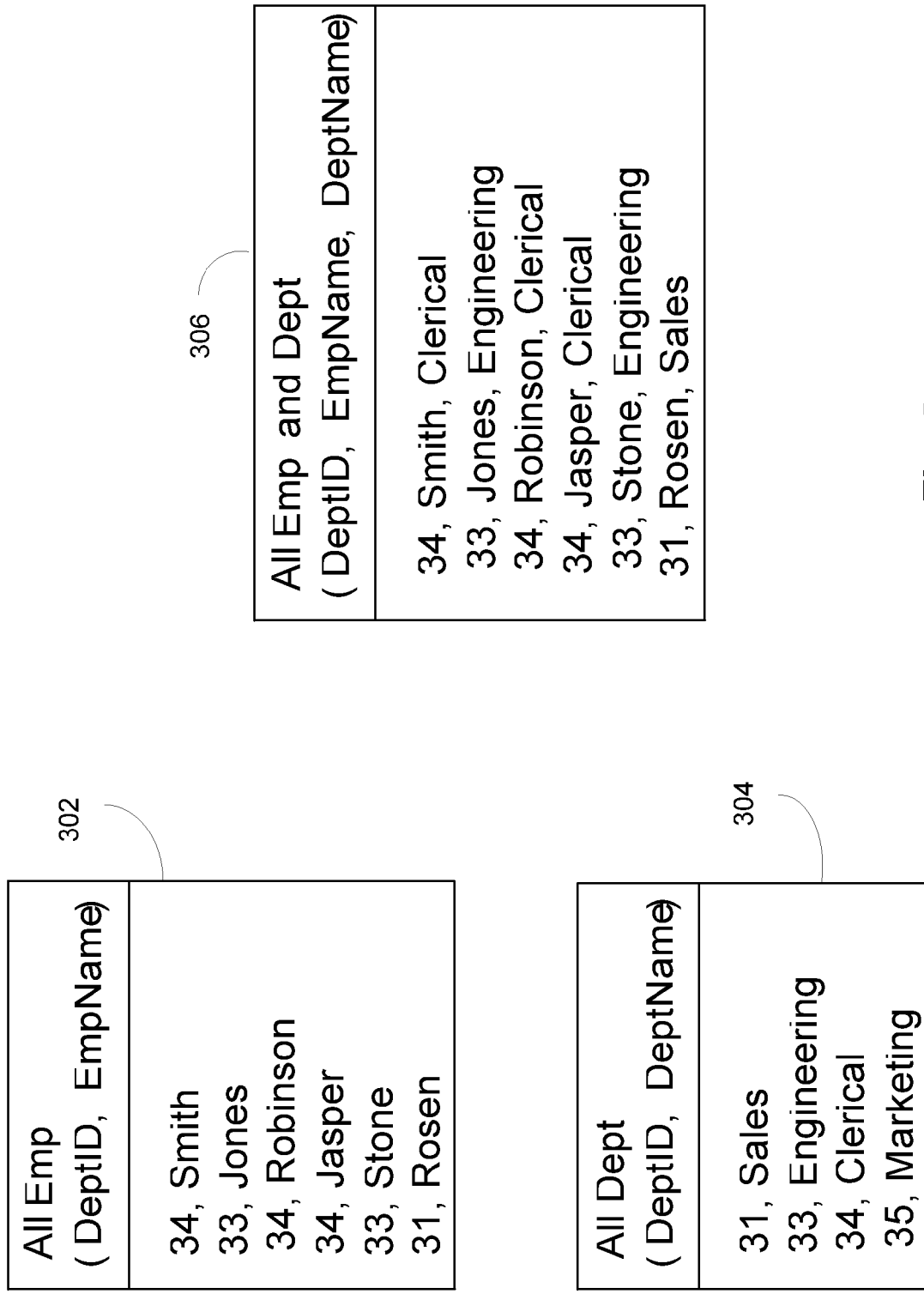
FIG. 3 graphically illustrates a join performed over two relational tables that have different schema.

For example, it is impractical to perform joins over two relational tables that have different schemas. FIG. 3 graphically illustrates such a join (without regard for any particular method or architecture for accomplishing such the join). Referring to FIG. 3, there are two tables, an "Employee" table 302 and a "Department" table 304 on which it may be desirable to perform a join operation. Each employee record in the Employee table 302 has key DeptID and value LastName, and each department record in the Department table 304 has DeptID and value DeptName. The result "Employee and Department" table 306 is a table that shows the department name for each employee. More specifically, the records of the Employee table 302 are joined with the records of the Department table 304 such that each record of the Employee and Department table 306 includes key DeptID and values LastName and DeptName.

Figure 4:
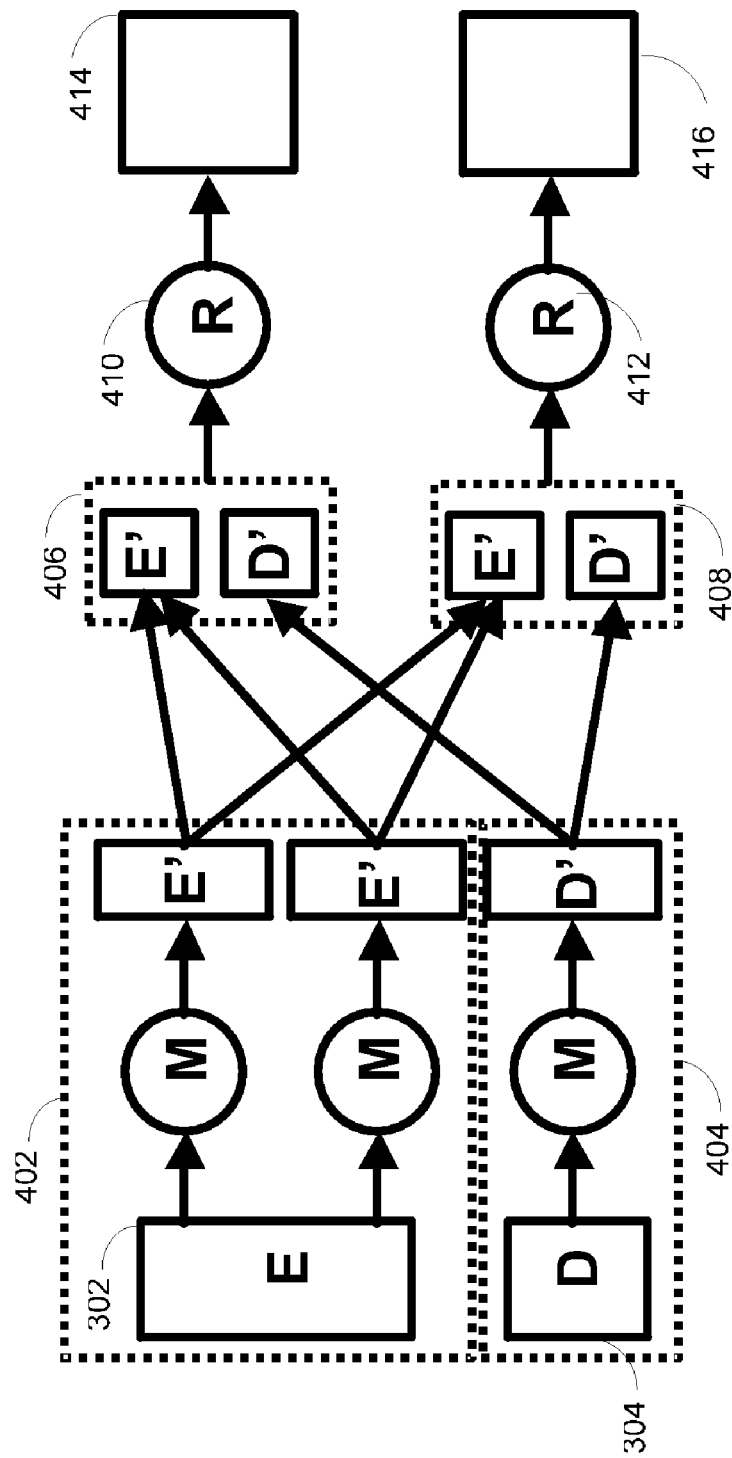
FIG. 4 illustrates a particular implementation of an improved MapReduce architecture that includes consideration for input groups, relative to the FIG. 3 example relational tables.

FIG. 4 illustrates an example of an improved MapReduce architecture in accordance with an aspect, and relative to the FIG. 3 example relational tables. It is noted that the schema of each data set, such as the FIG. 3 relational tables, includes a set of attributes (such as DeptID, LastName, DeptName) and their properties (such as their data types: integer DeptID, string LastName, string DeptName). As discussed above with respect to the conventional MapReduce architecture, input, intermediate and output data sets may each be characterized by their own schema, and each schema operates according to "key/value" pairs. The attributes in the key/value pairs may be distinct or overlapping; moreover, keys within a data set may be distinct or identical.

In the improved MapReduce architecture such as discussed with reference to FIG. 4, the input, intermediate and output data sets are partitioned into a set of data groups. With the partitioning into groups, it is likely that map functions corresponding to each group are different; data sets within the same group are characterized by the same schema; and data sets within different groups are characterized by different schemas it is also likely that map functions corresponding to each group are the same; data sets within all the groups are the same.

In general, partitioning the data sets into data groups enables a mechanism to associate (group) identifiers with data sets, map functions and iterators (useable within reduce functions to access intermediate data) and, also, to produce output data sets with (group) identifiers. It is noted that the output group identifiers may differ from the input/intermediate group identifiers.

Referring now to FIG. 4, each of the map tasks 402 and 404 are configured to operate on separate data groups, where each of the separate data groups is characterized by its own schema. In FIG. 4, the separate tables are labeled "E" and "D" to represent the "Employee" table 302 and the "Department" table 304, respectively.

Referring still to FIG. 4, the records of the intermediate data E' and D' retain an identification with the groups to which the original input data, resulting in particular intermediate data, belong. Thus, the intermediate data E' retains an identification with group E, and the intermediate data D' retains an identification with group D. That is, the intermediate data E' of the map task 502 retains an identification with the employee table 302, and the intermediate data D' of the map task 504 retains an identification with the department table 304.

Even the records of the partitioned data 406 and 408, after partitioning the records of the intermediate data to the various reduce tasks 410 and 412, retain an identification with the groups of the original input data (the employee table 302 and the department table 304). The reduce tasks 410 and 412 can access partitioned intermediate data for both groups 302 and 304 through one iterator per group, and the reduce tasks 410 and 412 can be programmed by users to use the iterators however desired.

In accordance with the described aspect, a programmer may view data as follows:

| input data | grouped sets of key/value pairs |
| intermediate data | grouped sets of key/value pairs |
| output data | (possibly grouped) sets of key/value pairs or values |

It is noted that the output data does not have to be grouped or key/value pairs, but it is useful in some instances, such as some instances in which MapReduce jobs are to be chained in a pipeline. It is also noted that there can be only one group.

We now provide some example syntax for map and reduce functions to employ the improved MapReduce architecture. As discussed above, a user/programmer typically provides map and reduce functions. In accordance with the described aspect, in the abstract, a map function may be specified as follows:

Map(group_id, in_key, in_value) → (group_id, list(out_key, intermediate_value))

Thus, for a particular group identified with a group_id, the map function processes each input key/value pair and produces one or more intermediate key/value pairs. In accordance with the described aspect, in the abstract, a reduce function may be specified as follows:

Reduce(list(group_id,list(out_key,intermediate_value)))→list(out_value)

Thus, the reduce function merges all intermediate data over all groups. Iterators specific to a particular group may be employed to iterate over that group's intermediate data. One or more output values are provided.

In the improved MapReduce, the partitioning operation after the mapping phase is generalized such that it has a configurable operation with two modes.

In the partitioning mode 1, the partitioning operation partitions the intermediate data into R partitions, where R is the number of reduce tasks. Each key/value pair goes to only one of the partitions. This is similar to what is done by the conventional MapReduce.

In the partitioning mode 2, it still partitions the intermediate data into R partitions but each key/value pair can go to a plurality of the partitions. In this mode, it is likely that the pairs will go to all the partitions.

For example, consider implementing a cross product of the tables in FIG. 3, in which every record of the Employee table 302 will be paired with every record of the Department table 304. The cross product can be achieved using two nested loops, one outer loop iterating over the records of the Employee table and one inner loop iterating over the records of the Department table. In the improved MapReduce, one possible implementation can map each employee to only one reducer but it can map each department to every reducer. In another possible implementation, it can map each employee to only one reducer and it may not map the departments at all. Instead, each reducer can read the departments directly from their local copy, if exists, or from a copy shared by the other reducers.

In the improved MapReduce, the operations can collect information about the data that they are processing. They can also save the information as metadata of the corresponding data. For example, the partitioning, grouping, and sorting operations can keep the smallest and largest keys in each partition processed. This information can be saved as part of the metadata of each partition. When an iterator is created to scan through the records of a partition, this metadata can be made available to the reduce function through the iterators. One example benefit is that this metadata can speed up comparisons. For example, in a processing of the data to find all records whose keys are smaller than a particular key, an entire partition can be skipped if its smallest key is larger than the particular key.

In some examples, the sorting operation is configurable, such that it can be turned on or off for some groups. This is in addition to the configurable sorting function that is also available in the conventional MapReduce. As such, the overhead to perform some operations may be reduced where, for example, sorting is not needed. One example of such a database operation is determining a cross product.

In the improved MapReduce, the reduce function has a configurable operation with three modes. They are named in the increasing order of generality as follows: the reduce mode 1, the reduce mode 2, and the reduce mode 3. These modes improve its capabilities to support the basic relational database processing operations. In all modes, the data accessible through the iterators over all groups are made available the reducer functions.

In the reduce mode 1, the records input to a reduce function through the group iterators carry or share the same key. If there is no record in a group that has the same key, the corresponding iterator is null. This mode helps implement an equijoin, a join over equal keys, efficiently. For example, it can produce the "Employee and Department" table 306 by equijoining the "Employee" table 302 and the "Department" table 204.

In the reduce mode 2, the records input to a reduce function through the group iterators need not carry the same key. The input records are the ones pointed to by the group iterators when the reduce function is invoked. The reduce function controls the manner in which keys, values, and iterators are used. This mode helps implement a join with an arbitrary predicate (such as comparisons) because it can implement the sort-merge join. For example, this mode together with the partitioning mode 2 can even implement the cross product of the employees and departments in FIG. 3.

In the reduce mode 3, the records input to a reduce function through the group iterators need not carry the same key as in the reduce mode 2. In addition, those of some groups need not even come from the intermediate data when the reduce function is invoked. They can come from data local to the reduce function or data shared by other reduce functions. For example, this mode can implement the cross product of the employees and departments in FIG. 3. To do that, the departments data can be accessed by every reduce function.

In the improved MapReduce, the map and reduce functions can be provided by the application developers or users. They can also be generated by a tool or program. For example, consider implementing the select operation of relation database processing to get from a given table those employees whose salary is larger than a certain limit. Using the schema of the data, it is possible for a tool or program to automatically generate a map function to implement this select operation. The automatic generation allows building higher-level interfaces on top of the improved MapReduce.

We now discuss an example, using psuedocode, of code to accomplish joining the records of the Employee table 302 with the records of the Department table 304, as discussed above relative to FIGS. 3 and 4, such that each record of the Employee and Department table 306 includes values LastName and DeptName, with the records sorted by the DeptID key. This example will use the reduce mode 1. The map functions may be defined as follows:

```
map(string group, string key, string val) {
    // group: "emp" or "dept"
    // key: DeptID
    // val: LastName for "emp", DeptName for "dept"
    DeptID = key;
    emit_to_group(group, DeptID, val);
}
```

The reduce functions may be defined as follows:

```
reduce(hashtable iterators) {
    // iterators: one iterator for "emp", another for "dept"
    DeptID = iterators.get_key( );
    emp_iter = iterators["emp"].get_iter( );
    dept_iter = iterators["dept"].get_iter( );
    for each LastName in emp_iter do {
        for each DeptName in dept_iter do {
            emit_to_group("emp_dept", DeptID, (LastName,
                DeptName));
        }
    }
}
```

If null iterators are possible and the database operation such as outer joins needs their handling, the reduce functions may also be defined as follows:

```
reduce(hashtable iterators) {
    // iterators: one iterator for "emp", another for "dept"
    DeptID = iterators.get_key( );
    emp_iter = iterators["emp"].get_iter( );
    dept_iter = iterators["dept"].get_iter( );
    if (emp_iter is not null and dept_iter is not null) then {
        for each LastName in emp_iter do {
            for each DeptName in dept_iter do {
                emit_to_group("emp_dept", DeptID, (LastName,
                    DeptName));
            }
        }
    }
}
```

-continued

```
    else if (emp_iter is not null and dept_iter is null) then {
        // null iterator handling for left and full outer joins
        for each LastName in emp_iter do {
            emit_to_group("emp_dept", DeptID, (LastName, null));
        }
    }
    else if (emp_iter is null and dept_iter is not null) then {
        // null iterator handling for right and full outer joins
        for each DeptName in dept_iter do {
            emit_to_group("emp_dept", DeptID, (null, DeptName));
        }
    }
    else {
        // both iterations being null can be a warning or an error
    }
}
```

As mentioned above, the output group identifiers may be different from the input/intermediate group identifiers. For example, the reduce functions above produce output data set with the "emp_dept" group identifier from intermediate data sets with the "emp" and "dept" group identifiers.

It is noted that the use of the iterators is flexible, so that the programmer can use the iterators as desired to accomplish a desired function. It is also noted that the data structure to implement iterators can be any data structure that can efficiently return the iterator of a group given the group identification. Hash table is only one example of such a data structure.

It is further noted that the iterators can carry metadata for the data that they are created for. The metadata may include various statistics. This capability is in addition to the counter facility that the conventional MapReduce provides.

Having provided an example of the code for the map and reduce functions to accomplish joining the records of the Employee table 302 with the records of the Department table 304, we now discuss an example execution of the map and reduce functions. For example, the map function may be called as follows:

map("emp", 34, "Smith")

which results in the data "34 Smith" being emitted into files with an "emp" extension. The "emp" extension identifies the data with the "emp" group. The map function may further be called as follows:

map("dept", 34, "Clerical")

which results in the data "34 Clerical" being emitted into files with a "dept" extension. There would further be additional calls to the map function that are not listed here.

The reduce function may be called as follows:

reduce((34, ("emp", ("Smith", "Robinson", "Jasper")), ("dept", ("Clerical"))))

A partial example output of the reduce function may then be as follows:

"34, Smith, Clerical"
"34, Robinson, Clerical"
"34, Jasper, Clerical"

It is noted that the output will be sorted by the DeptID record as a side-effect of MapReduce. The sorting happens in both the conventional MapReduce and the improved MapReduce although it can also be turned off in the improved MapReduce.

Figure 5:
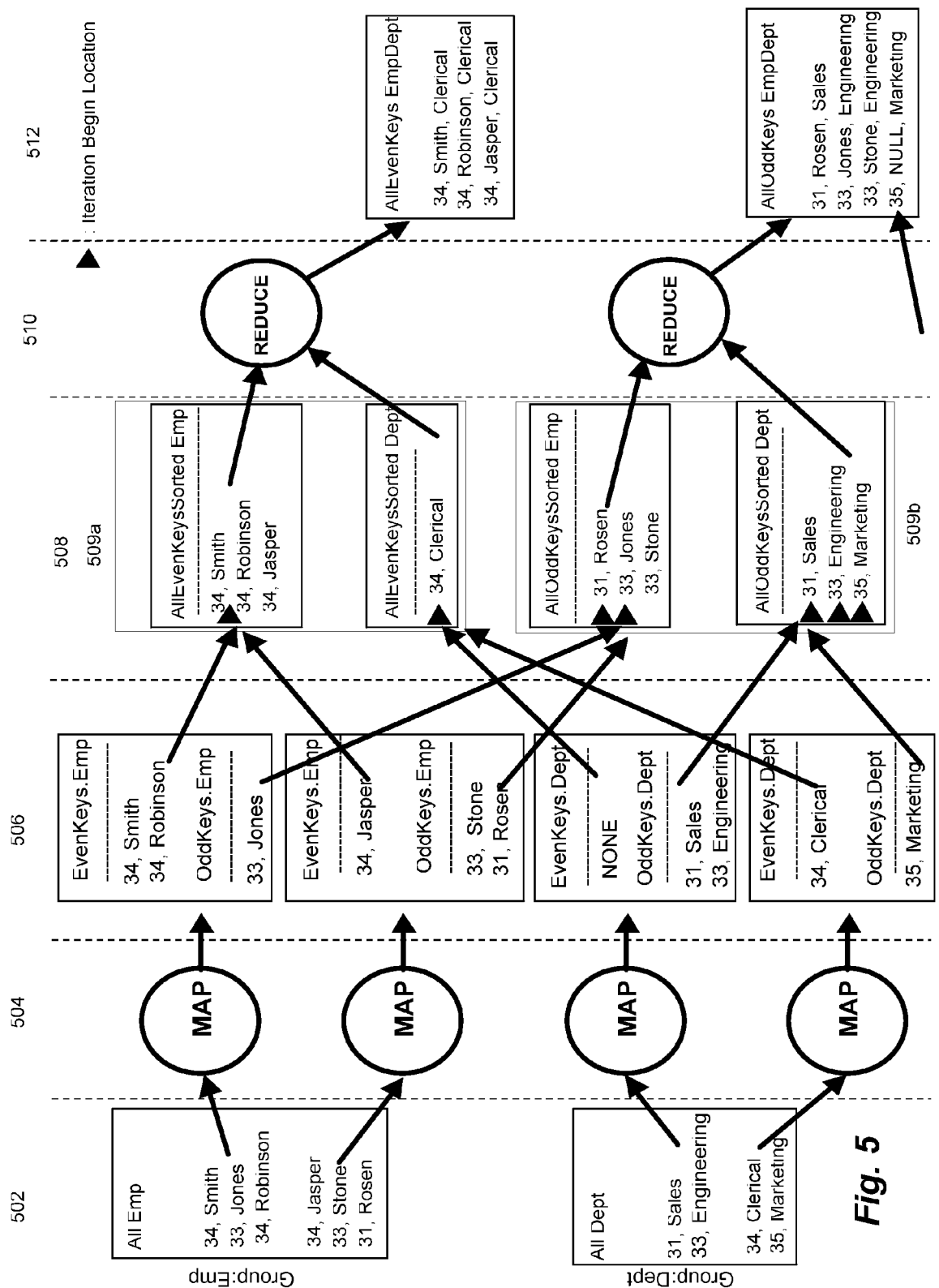
FIG. 5 schematically illustrates, in greater detail, processing by the improved MapReduce architecture to join the records (FIG. 3) of the Employee table 302 with the records of the Department table 304 to generate the Employee and Department table 306.

FIG. 5 more fully illustrates, with the full data of the Employee table 302 and the Department table 304, processing by an example of the improved MapReduce to equijoin the records of the Employee table 302 with the records of the Department table 304 to generate the Employee and Department table 306, where each record shows the department name for one employee. Referring specifically to FIG. 5, the Employee table 302 and the Department table 304 are shown in the portion 502 of FIG. 5. The map functions are shown within the portion 504 of FIG. 5.

The portion 506 of FIG. 5 includes the intermediate results of applying the map functions followed by the partitioning into even-keyed records and odd-keyed records. This partitioning function is just one of many possible partitioning functions. The intermediate results within the portion 506 are analogous to the boxes labeled E' and D' within map tasks 402 and 404 in FIG. 4. The intermediate results within the portion 508 in FIG. 5 are analogous to the partitioned results 406 and 408 in FIG. 4. In FIG. 5, the partitioning results are sorted into even-keyed records 509a and odd-keyed records 509b. The sorted partitioned results within portion 508 are provided to reduce functions within the portion 510, and the portion 512 includes the result Employee and Department table 306. It is noted that in the special case of department ID 35, there are no employees in the Employee table 502 for department ID 35, so the record in the Employee and Department table 306 for department ID 35 was generated based on a null iterator for the employee group. (In general, a null iterator can occur for both groups. The null iterators are handled in reduce functions in the way that the programmer desires. For example, as discussed before, outer join types utilize the generation of an output record with some null attribute values.)

As discussed, then, the MapReduce concept may be utilized to carry out map processing independently on two or more related datasets (e.g., related by being characterized by a common key) even when the related data sets are heterogeneous with respect to each other, such as data tables organized according to different schema. The intermediate results of the map processing (key/value pairs) for a particular key can be processed together in a single reduce function by applying a different iterator to intermediate values for each group. In this way, operations on the two or more related datasets may be carried out more efficiently or in a way not even possible with the conventional MapReduce architecture.

What is claimed is:
1. A method of processing data of a data set over a distributed system, wherein the data set comprises a plurality of data groups, the method comprising:
partitioning the data of each one of the data groups into a plurality of data partitions that each have a plurality of key-value pairs and providing each data partition to a selected one of a plurality of mapping functions that are each user-configurable to independently output a plural- ity of lists of values for each of a set of keys found in such map function's corresponding data partition to form corresponding intermediate data for that data group and identifiable to that data group, wherein the data of a first data group has a different schema than the data of a second data group and the data of the first data group is mapped differently than the data of the second data group so that different lists of values are output for the corresponding different intermediate data, wherein the different schema and corresponding different intermediate data have a key in common; and reducing the intermediate data for the data groups to at least one output data group, including processing the intermediate data for each data group in a manner that is defined to correspond to that data group, so as to result in a merging of the corresponding different intermediate data based on the key in common, wherein the mapping and reducing operations are performed by a distributed system.

2. The method of claim 1, wherein:

the at least one output data group is a plurality of output data groups.

3. The method of claim 1, wherein:

corresponding intermediate data for a data group being identifiable to the data group includes the corresponding intermediate data being stored such that metadata associated with a manner of storage is identifiable to the data group.

4. The method of claim 1, wherein:

corresponding intermediate data for a data group being identifiable to the data group includes the corresponding intermediate data being stored in association with data that is identifiable to the data group.

5. The method of claim 1, wherein:

processing the intermediate data for each data group in a manner that is defined to correspond to that data group includes, for each data group, employing an iterator that corresponds to that data group.

6. The method of claim 1, wherein:

the intermediate data includes a plurality of grouped sets of key/value pairs;

the reducing step is carried out by a plurality of reducers;

the method further comprises:

partitioning the intermediate data into a plurality of partitions, each key/value pair of the intermediate data being provided to a separate one of the partitions; and providing the intermediate data of each partition to a separate one of the reducers.

7. The method of claim 1, wherein:

the intermediate data includes a plurality of grouped sets of key/value pairs;

the reducing step is carried out by a plurality of reducers;

the method further comprises:

partitioning the intermediate data into a plurality of partitions, at least some of the key/value pairs of the intermediate data being provided to more than one of the partitions; and providing the intermediate data of each partition to a separate one of the reducers.

8. The method of claim 7, wherein:

in the partitioning step, all of the key/value pairs of the intermediate data are provided to all of the partitions.

9. The method of claim 7, wherein:

at least some of the reducers include a sort, group-by-key and combine task;

the method further comprises generating and providing metadata for at least some of the mapping, partitioning, combining, grouping and sorting.

10. The method of claim 9, wherein:

the reducing step includes processing the metadata.

11. The method of claim 10, wherein:

processing the intermediate data for each data group in a manner that is defined to correspond to that data group includes, for each data group, employing an iterator that corresponds to that data group, wherein the iterator includes providing the associated metadata to the processing of the reducing step.

12. The method of claim 5, wherein:

the intermediate data includes a plurality of grouped sets of key/value pairs;

the reducing step is carried out by a plurality of reducers;

for at least one of the reducers, the iterator corresponding to a particular data group, for that reducer, operates according to a different key of a different schema than the iterator corresponding to another particular data group, for that reducer.

13. The method of claim 1, wherein:

the intermediate data processing step of the reducing step further comprises processing data that is not intermediate data.

14. The method of claim 13, wherein:

the reducing step is carried out by a plurality of reducers; and the data that is not intermediate data, for a particular reducer, includes data that is associated with another reducer.

15. The method of claim 13, wherein:

the reducing step is carried out by a plurality of reducers; and the data that is not intermediate data, for a particular reducer, includes data that is associated with that reducer.

16. The method of claim 1 wherein the reducing step includes relating the data among the plurality of data groups.

17. A computer system including a plurality of computing devices, the computer system configured to process data of a data set, wherein the data set comprises a plurality of data groups, the computer system comprises at least one processor and memory that are operable to perform the following operations:

partitioning the data of each one of the data groups into a plurality of data partitions that each have a plurality of key-value pairs and providing each data partition to a selected one of a plurality of mapping functions that are each user-configurable to independently output a plurality of lists of values for each of a set of keys found in such map function's corresponding data partition to form corresponding intermediate data for that data group and identifiable to that data group, wherein the data of a first data group has a different schema than the data of a second data group and the data of the first data group is mapped differently than the data of the second data group so that different lists of values are output for the corresponding different intermediate data, wherein the different schema and corresponding different intermediate data have a key in common; and reduce the intermediate data for the data groups to at least one output data group, including processing the intermediate data for each data group in a manner that is defined to correspond to that data group so as to result in a merging of the corresponding different intermediate data based on the key in common.

18. The computer system of claim 17, wherein:
the at least one output data group is a plurality of output data groups.

19. The computer system of claim 17, wherein:
corresponding intermediate data for a data group being identifiable to the data group includes the corresponding intermediate data being stored such that metadata associated with the manner of storage is identifiable to the data group.

20. The computer system of claim 19, wherein:
corresponding intermediate data for a data group being identifiable to the data group includes the computer system being configured to store the corresponding intermediate data in association with data that is identifiable to the data group.

21. The computer system of claim 17, wherein:
the at least one processor and memory being configured to process the intermediate data for each data group in a manner that is defined to correspond to that data group includes, for each data group, the at least one processor and memory being configured to employ an iterator that corresponds to that data group.

22. The computer system of claim 21, wherein:
the intermediate data includes a plurality of grouped sets of key/value pairs;
the at least one processor and memory are further operable to reduce the intermediate data via a plurality of reducers;
for at least one of the reducers, the iterator corresponding to a particular data group, for that reducer, is configured to operate according to a different key of a different schema than the iterator corresponding to another particular data group, for that reducer.

23. The computer system of claim 17, wherein:
the intermediate data includes a plurality of grouped sets of key/value pairs;
the at least one processor and memory are further operable to reduce the intermediate data via a plurality of reducers; and
the at least one processor and memory are further operable to:
partition the intermediate data into a plurality of partitions, to provide each key/value pair of the intermediate data to a separate one of the partitions; and
provide the intermediate data of each partition to a separate one of the reducers.

24. The computer system of claim 17, wherein:
the intermediate data includes a plurality of grouped sets of key/value pairs;
the at least one processor and memory are further operable to reduce the intermediate data via a plurality of reducers; and
the at least one processor and memory are further operable to:
partition the intermediate data into a plurality of partitions, to provide at least some of the key/value pairs of the intermediate data to more than one of the partitions; and
provide the intermediate data of each partition to a separate one of the reducers.

25. The computer system of claim 24, wherein:
the at least one processor and memory are further operable to, in partitioning, to provide all of the key/value pairs of the intermediate data to all of the partitions.

26. The computer system of claim 24, wherein:
at least some of the reducers include a sort, group-by-key and combine task;
the at least one processor and memory are further operable to
generate and provide metadata for at least some of the mapping, partitioning, combining, grouping and sorting.

27. The computer system of claim 26, wherein:
the reducing includes processing the metadata.

28. The computer system of claim 27, wherein:
the at least one processor and memory being further operable to process the intermediate data for each data group in a manner that is defined to correspond to that data group includes, for each data group, the at least one processor and memory being further operable to employ an iterator that corresponds to that data group, wherein the iterator is configured to provide the associated metadata to the reducing.

29. The computer system of claim 17, wherein:
the intermediate data processing of the reducing further comprises processing data that is not intermediate data.

30. The computer system of claim 29, wherein:
the at least one processor and memory are further operable to reduce the intermediate data via a plurality of reducers; and
the data that is not intermediate data, for a particular reducer, includes data that is associated with another reducer.

31. The computer system of claim 29, wherein:
the at least one processor and memory are further operable to reduce the intermediate data via a plurality of reducers; and
the data that is not intermediate data, for a particular reducer, includes data that is associated with that reducer.

32. The computer system of claim 17, wherein the at least one processor and memory are further operable to reduce by relating the data among the plurality of data groups.

33. A map-reduce method of processing data from a plurality of groups having different schema over a computer system, the method comprising:
for a first data set having a plurality of first key-value pairs, wherein such first data set belongs to a first data group and the first key-value pairs have a first schema, partitioning the first data set into a plurality of data partitions and providing each data partition to a selected one of a plurality of mapping functions that are each user-configurable to independently output a plurality of lists of values for each of a set of keys found in such map function's corresponding data partition to form a first intermediate data set having a first set of resulting key-value pairs;
for a second data set having a plurality of second key-value pairs, wherein such second data set belongs to a second data group and the second key-value pairs have a second schema, partitioning the first data set into a plurality of data partitions and providing each data partition to a selected one of a plurality of mapping functions to form a second intermediate data set having a second set of resulting key-value pairs differing from the first set of resulting key-value pairs, wherein the first schema differs from the second schema, wherein the first and second schema and the first and second set of resulting key-value pairs have a key in common; and reducing the first and the second intermediate data set together so as to form an output data set, wherein the reducing is accomplished by iterating on at least one key from the first and second intermediate data set, and the output data set has a different schema than the first and second schema, wherein the mapping and reducing operations are performed by a distributed system.

34. The map-reduce method of claim 33, wherein the reducing is accomplished by iterating on at least one key from each of the first and second intermediate data set so that the output data set is a merging of a portion of the first and second intermediate data set.

35. The map-reduce method of claim 33, wherein the reducing is accomplished by a plurality of reducers, the method further comprises:

partitioning the first or second intermediate data set into a plurality of partitions, at least some of the key-value pairs of the first or second intermediate data being provided to more than one of the partitions; and providing the partitioned intermediate data set of each partition to a separate one of the reducers.

36. The map-reduce method of claim 35, wherein all of the key-value pairs of the first and second intermediate data set are provided to all of the reducers.

37. The map-reduce method of claim 35, wherein at least some of the reducers include a sort, group-by-key and combine task, the method further comprises generating and providing metadata for at least some of the mapping, partitioning, combining, grouping and sorting.

38. The map-reduce method of claim 37, wherein the reducing includes processing the metadata.

39. The map-reduce method of claim 38, wherein iterating includes providing the associated metadata to the processing of the reducing step.

40. A computer system including a plurality of computing devices, the computer system configured to process data of a data set, wherein the data set comprises a plurality of data groups, the computer system comprises at least one processor and memory that are operable to perform the following operations:

for a first data set having a plurality of first key-value pairs, wherein such first data set belongs to a first data group and the first key-value pairs have a first schema, partitioning the first data set into a plurality of data partitions and providing each data partition to a selected one of a plurality of mapping functions that are each user-configurable to independently output a plurality of lists of values for each of a set of keys found in such map function's corresponding data partition to form a first intermediate data set having a first set of resulting key-value pairs;

for a second data set having a plurality of second key-value pairs, wherein such second data set belongs to a second data group and the second key-value pairs have a second schema, partitioning the first data set into a plurality of data partitions and providing each data partition to a selected one of a plurality of mapping functions to form a second intermediate data set having a second set of resulting key-value pairs differing from the first set of resulting key-value pairs, wherein the first schema differs from the second schema; and reducing the first and the second intermediate data set together so as to form an output data set, wherein the reducing is accomplished by iterating on at least one key from the first and second intermediate data set, and the output data set has a different schema than the first and second schema, wherein the first and second schema and the first and second set of resulting key-value pairs have a key in common.

41. The computer system of claim 40, wherein the reducing is accomplished by iterating on at least one key from each of the first and second intermediate data set so that the output data set is a merging of a portion of the first and second intermediate data set.

42. The computer system of claim 40, wherein the reducing is accomplished by a plurality of reducers, the d the at least one processor and memory further operable for:

partitioning the first or second intermediate data set into a plurality of partitions, at least some of the key-value pairs of the first or second intermediate data being provided to more than one of the partitions; and providing the partitioned intermediate data set of each partition to a separate one of the reducers.

43. The computer system of claim 42, wherein all of the key-value pairs of the first and second intermediate data set are provided to all of the reducers.

44. The computer system of claim 42, wherein at least some of the reducers include a sort, group-by-key and combine task, the d the at least one processor and memory are further operable for:

generating and providing metadata for at least some of the mapping, partitioning, combining, grouping and sorting.

45. The computer system of claim 44, wherein the reducing includes processing the metadata.

46. The computer system of claim 45, wherein iterating includes providing the associated metadata to the processing of the reducing step.

* * * * *